United States Patent [19]

Bosselaar et al.

[11] 3,893,151

[45] July 1, 1975

[54] SEMICONDUCTOR MEMORY DEVICE AND FIELD EFFECT TRANSISTOR SUITABLE FOR USE IN THE DEVICE

[75] Inventors: Cornelis Albertus Bosselaar; Olof Erik Hans Klaver, both of Nijmegen; Jan Florus Verwey; Johannes Gerrit Van Santen, both of Emmasingel, Eindhoven, all of Netherlands

[73] Assignee: U.S. Philips Corporation, New York, N.Y.

[22] Filed: June 7, 1973

[21] Appl. No.: 367,957

[30] Foreign Application Priority Data

June 13, 1972 Netherlands ........................ 7208026

[52] U.S. Cl. ........................ 357/23; 357/41; 357/30; 357/13; 357/22; 357/59

[51] Int. Cl. ............................................ H01l 11/14

[58] Field of Search ....... 317/235 B, 235 G; 357/41, 357/23, 13, 22, 59, 30

[56] References Cited

UNITED STATES PATENTS

| | | | |
|---|---|---|---|
| 3,660,819 | 5/1972 | Bentchkowsky | 317/235 R |
| 3,728,695 | 4/1973 | Bentchkowsky | 340/173 R |
| 3,755,721 | 8/1973 | Bentchkowsky | 317/235 R |

*Primary Examiner*—Martin H. Edlow

*Attorney, Agent, or Firm*—Frank R. Trifari; Leon Nigohosian

[57] ABSTRACT

Semiconductor memory device in which charge carriers are injected between a semiconductor surface and a gate electrode separated from the semiconductor surface by an insulating layer to effect a change in the characteristics of the device.

According to the invention for the storage of information a depletion zone is formed across which a voltage drop is applied which is lower than the voltage at which avalanche multiplication occurs, but higher than the potential barrier for the charge carriers at the interface between the insulating layer and the semiconductor material, while charge carriers are injected into this depletion zone by means of a p-n junction or by radiation.

16 Claims, 7 Drawing Figures

SEMICONDUCTOR MEMORY DEVICE AND FIELD EFFECT TRANSISTOR SUITABLE FOR USE IN THE DEVICE

BACKGROUND OF THE INVENTION

The invention relates to a semiconductor memory device comprising a semiconductor body having a region adjacent a surface of the body which is at least partly, covered by an electrically insulating layer, a gate electrode separated from the semiconductor surface by the insulating layer, and means of temporarily forming in said region below the gate electrode a depletion zone adjacent to the insulating layer, in order to inject charge carriers from the semiconductor body into the insulating layer, as a result of which the electrical properties of the device are changed. The invention furthermore relates to a field-effect transistor, suitable for use in such memory device.

Semiconductor memory devices of the type described above, whose electrical properties are changed by injection of a charge into an insulating dielectric layer present on the semiconductor surface, are known. The charge thereby is injected from the semiconductor body into the electrically insulating layer in the form of charge carriers. In practice two fundamentally different mechanisms are used for this injection.

In the first method injection can take place by means of a tunnel effect. This is for instance the case in so-called MNOS (Metal Nitride Oxide Semiconductor) transistors, as are described for instance in "Proceedings I.E.E.E.", Vol. 58, August 1970 pp. 1207–1219. The field-effect transistor used there has an insulated gate electrode; the insulating layer between the gate electrode and the substrate consists of a thin layer of silicon oxide on this substrate, for instance 20 Angstrom thick, on which a layer of silicon nitride has been applied, the gate electrode having been applied to the nitride. By a voltage pulse on the gate electrode charge carriers are transported from the substrate through the thin oxide layer by means of a tunnel process. The carriers are then retained in traps which are found in particular at the oxide-nitride interface. The electrical charge in the insulating layer below the gate electrode thus generated changes among other things the threshold voltage of the field-effect transistor, i.e. the voltage between the gate electrode and the channel region at which a channel starts forming between the source and drain zones. The charge carriers can be removed from the insulating layers by tunnelling in reverse direction, for instance by applying a voltage pulse of opposite polarity.

The important drawback of these devices is that it is technologically very difficult to apply the very thin oxide layer intended to make the whole process possible in a reproducible way.

Another method of injecting charges into a dielectric layer and a method that can more easily be applied in practice, is that of injection resulting from an avalanche breakdown in the semiconductor material. A semiconductor memory device operating on this principle and known by the name of FAMOS (Floating-gate Avalanche-injection Metal Oxide Semiconductor) structure is described in "I.E.E.E. Journal of Solid State Circuits", Vol. SC6, October 1971, pp.301–306. The device concerned is a field-effect transistor with insulated gate electrode containing a "floating" gate electrode in the form of a non-connected conductive layer which is usually surrounded by insulating material. By now applying in reverse direction across the source-substrate junction or the drain-substrate junction a voltage so high that avalanche breakdown occurs, charge carriers are generated at the junction. On account of the electrical field applied across the junction the energy of these charge carriers attains so high a level that they are capable of travelling from their energy band in the semiconductor material to the corresponding energy band of the insulating layer below the gate electrode and of travelling via this insulating layer to the floating gate electrode, as a result of which the latter is charged. Thus "hot" electrons can move from the conduction band in the semiconductor body to the conduction band of the insulating layer. Inversely, hot holes of the valence band in the semiconductor body may shift to the valence band of the insulating layer. As is usual in semiconductor technique, the term hot charge carriers is intended to mean charge carriers whose energy is higher, preferably several times higher than the energy corresponding to the temperature of the crystal lattice of the semiconductor body.

The injected hot charge carriers remain in the insulating layer and mainly on the floating gate electrode as an electric charge. On account of this a conductive channel can be formed in the field-effect transistor, for instance below the gate electrode of a field-effect transistor which originally has no conductive channel, which is the case with a transistor of the so-called enhancement type, or, if such a conductive channel was already present (which is the case with a transistor of the so-called depletion type) this channel can be eliminated. Consequently the transistor can change from the non-conductive to the conductive state, or conversely, if hot charge carriers are injected. This new state is practically permanent. Such a memory element is eminently suitable for use in "read-only" memories. Such an element is furthermore known in the version in which a gate electrode has been applied over the floating gate electrode, separated from it by an insulating layer. A potential can be applied to the gate electrode to facilitate injection of charge carriers from the semiconductor body into the insulating layer (International Solid State Circuit Conference, February 1972, pp. 52–53).

It is also known that charge carriers can be injected into an insulating layer covering the emitter-base junction of a planar bipolar transistor. In some cases this is done with the aid of a gate electrode applied to the insulating layer. An emitter-base junction is then temporarily biased in the reverse direction so that avalanche multiplication occurs, see for instance "Applied Physics Letters", 15th Oct. 1969, pp. 270–272. On account of this for instance the amplification factor of the transistor will be changed.

Bringing about an avalanche multiplication at a p-n junction, as described above, has a few drawbacks, however, which may strongly reduce the practicability of these devices as memory elements under certain conditions.

This avalanche injection, for instance, is very localised and only occurs in the immediate vicinity of the p-n junction. This causes problems if homogeneous injection is required over a relatively large surface area, for instance over the entire length of the channel of a field-effect transistor with insulated gate electrode. This can indeed be remedied by using a floating gate electrode, as was described above, which acts as a equipotential surface and carries the whole injected charge, but in that case also very strong voltage pulses are required for storage in such memory elements.

OBJECT OF THE INVENTION

One of the objects of the invention is to provide a semiconductor memory device in which the above-described drawbacks of the known devices are avoided or at least reduced to a considerable extent.

Another object of the invention is to provide a semiconductor memory device suitable for storing larger information-carrying charges in a shorter time than is possible with the device now known.

A further object of the invention is to provide a memory device that offers more possibilities for controlling the charge to be stored than the known devices already described.

BRIEF DESCRIPTION OF THE INVENTION

One of the ideas underlying the invention is that by using relatively weak voltage pulses in combination with a controlled supply of charge carriers to be injected into the insulating layer the known semiconductor memory devices already described can be considerably improved and their range of application extended.

Consequently a semiconductor memory device of the type described in the preamble according to the invention is characterized in that the voltage drop over said depletion zone is lower than the voltage at which avalanche multiplication occurs but higher than the potential barrier for the said charge carriers at the interface between the semiconductor body and the insulating layer, and that the said charge carriers are injected into the depletion zone, a voltage being simultaneously applied to the gate electrode, as a result of which a force in the direction of said interface is exerted on the said charge carriers.

The invention is based on the consideration that hot charge carriers having a sufficiently high energy to overcome the energy barrier between semiconductor material and the insulating layer covering the surface need not be generated by an avalanche process, but can also be obtained by acceleration in a depletion zone across which a lower voltage drop occurs than is the case with an avalanche effect.

Since in this process, unlike the afore-mentioned avalanche processes, the charge carriers to be accelerated are not generated in the depletion zone in a sufficiently large quantity, according to the invention they are injected into the depletion zone. Consequently the drawbacks attaching to avalanche injection are eliminated, but furthermore an additional degree of freedom is obtained for controlling the information-carrying charge to be injected. By applying the aforementioned voltage to the gate electrode during injection a homogeneous electric field is created which forces the charge carriers over the entire area covered by the gate electrode in the direction of an interface between the semiconductor body and the insulating layer.

BRIEF DESCRIPTION OF DRAWINGS

The invention will now be explained in greater detail with the aid of a few examples and the drawin in which FIG. 1 diagrammatically shows a top view of a semiconductor memory device with a field-effect transistor according to the invention, FIG. 2 diagrammatically gives a cross-section according to line II—II of the device according to FIG. 1.

Figure 1:
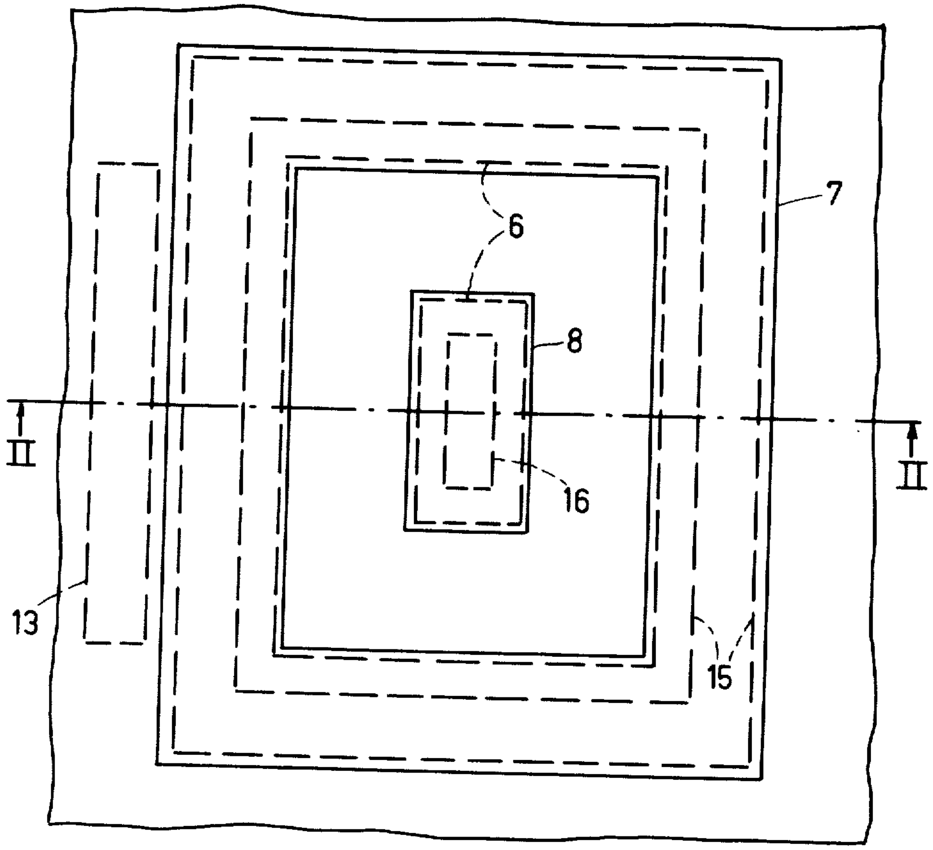

The figures have been drawn diagrammatically and not to scale. In the top view of FIG. 1 and 5 the edges of the metal layers are indicated by dotted lines.

PREFERRED EMBODIMENT

The above-mentioned depletion zone in which there are accelerated the charge carriers to be injected, is formed according to a preferred embodiment of the invention, because a rectifying junction, for instance a p-n junction is present which ends at said interface below the gate electrode at least part of the depletion zone being formed by applying temporarily a voltage across the afore-mentioned rectifying junction in reverse direction. The energy of the charge carriers to be injected can then be controlled by varying the blocking voltage across the rectifying junction, while a voltage is applied between the gate electrode and the semiconductor surface. This latter voltage forces the charge carriers to be injected in the direction of the semiconductor surface.

Another preferred embodiment of the semiconductor memory device according to the invention is characterized by the fact that at least part of the depletion zone is formed by temporarily applying such a voltage between the gate electrode and said region of the semiconductor body that majority-charge carriers are removed from a surface zone of this region.

The above-mentioned methods of forming the depletion zone required, or a combination of these, are the most suitable methods in practice, though of course there are other possibilities to induce in the semiconductor body 1 an electric field so that a depletion zone is formed in which sufficient energy can be supplied to the charge carriers to be injected into the insulating layer.

It is also possible to inject the charge carriers to be accelerated into the depletion zone by using various techniques. According to a preferred embodiment charge carriers are injected into the depletion zone by means of a p-n junction which is temporarily biased in forward direction. This p-n junction for instance injects electrons into the depletion zone in the *n*-type area of another p-n junction biased in reverse direction so that these electrons obtain a sufficiently high energy level to be injected into the conduction band of an insulating layer present on the surface of said *n*-type region for instance an oxide layer. To achieve effective injection into the depletion zone it is then desirable that the maximum distance between the p-n junction temporarily biased in forward direction and the afore-mentioned rectifying junction is at most equal to one diffusion length of the charge carriers to be injected into the said region concerned.

In a planar transistor, for instance, the collector-base junction can be used advantageously as an injecting p-n junction. In view of this a preferred embodiment according to the invention is characterized by the fact that the p-n junction temporarily biased in reverse direction is the emitterbase junction and that the injecting p-n junction temporarily biased in forward direction is the collector-base junction of a bipolar transistor. According to another method the charge carriers to be accelerated are injected into the depletion zone by radiation temporarily impinging on the semiconductor body, which radiation generates electron-hole pairs in the depletion zone. This radiation may be either of an electromagnetic or corpuscular nature. A very important preferred embodiment which is particularly convenient in practice is according to this invention characterized by the fact that the gate electrode and the insulating layer form part of a field-effect transistor with insulated gate electrode, the depletion zone being formed in the channel area of the transistor situated between the source and drain electrodes. Such field-effect transistors are eminently suitable for use in memory circuits. A preferred form of the device according to the invention is characterized by the fact that the aforementioned field-effect transistor is of the depletion type and that, on account of the injection of information-carrying charge carriers, it is converted into a transistor of the enhancement type, or conversely.

Though it is possible to obtain the charge carriers to be accelerated in the channel area in another way, for instance by making radiation impinge, this preferred form is designed so that the field-effect transistor contains a layer-shaped surface-adjacent channel area of the first conduction type which forms with an underlying region of the second conduction type the injecting p-n junction. The injecting p-n junction is practically parallel to the surface.

The source and drain electrodes of the field-effect transistors concerned may contain surface zones of a conduction type opposed to that of the channel area. In desired at least the drain electrode may be constituted by a rectifying metal-semiconductor junction (Schottky-diode).

The insulating layer present between the gate electrodes and the semiconductor surface may be homogeneous. Under certain conditions this layer may, however, advantageously consist of two or more layers, for instance a silicon-oxide layer covering the semiconductor surface, in turn coated with a layer of silicon nitride, as a result of which a large number of collecting centres for the information-carrying charge carriers to be injected are present in the oxide-nitride junction.

Since it is recommended that the information-carrying charge of the field-effect transistor of type described above should be applied homogeneously over the entire channel area between the gate electrode and the semiconductor surface — this area being located between the source and drain electrodes — the presence of a floating electrode situated between the gate electrode and the semiconductor surface is advantageous. Consequently an important preferred embodiment according to the invention is characterized in that a non-connected conductive layer separated from the gate electrode and from the semiconductor surface by the insulating layer is applied between the gate electrode and the semiconductor surface. This layer is preferably enclosed by insulating material and may consist of any conductive material, but should preferably consist of polycrystalline silicon, which inter alia offers important technological advantages. This polycrystalline silicon may if so desired be doped to increase its conductivity; naturally this conductivity must be very much higher than that of the insulating layer . . . .

The invention furthermore relates to a field-effect transistor with insulated gate electrode of a new design, which is very suitable for use in a semiconductor memory device of the type described above. Such a field-effect transistor comprises a semiconductor body with a surfaceadjacent layer-shaped channel area of a first conduction type two separate source and drain electrodes adjacent to the surface of which at least the source electrode consists of a surface zone of the second conduction type constituting a p-n junction with a channel area, an insulating layer present on the semiconductor surface at least between the source and drain electrodes, a gate electrode separated from the semiconductor surface by said insulating layer, and between the gate electrode and the semiconductor surface a non-connected conductive layer separated from the gate electrode and from the semiconductor surface by the insulating layer, and is characterized in that the layer-shaped channel area forms a p-n junction with an underlying region of the second conduction type.

Figure 2:
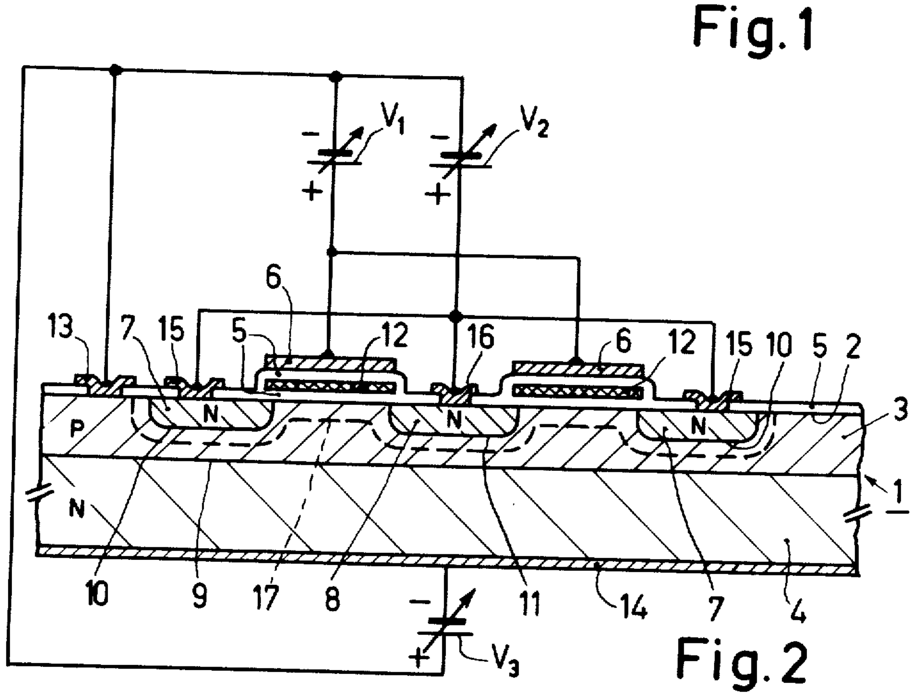

FIG. 1 diagrammatically shows a top view and FIG. 2 diagrammatically shows a cross-section according to the line II—II of FIG. 1 of a semiconductor memory device with a field-effect transistor according to the invention. The device contains (see FIG. 2) a semiconductor body 1 made of silicon with a region 3 in the form of a *p*-type silicon layer with a thickness of 6.6 microns and a specific resistance of 0.2 Ohm.cm epitaxially grown on a *n*-type substrate 4 with a resistivity of 0.01 Ohm.cm and a thickness of 200 microns; this layer is adjacent to a surface 2. The major part of region 3 is coated with an electrically insulated silicon-oxide layer 5. The device furthermore contains an electrically conductive gate electrode 6 separated from the semiconductor surface 2 by the silicon oxide layer 5. This gate electrode may be made of metal, as in this example, for instance aluminium, but if so desired it may also be made of doped polycrystalline silicon. The said gate electrode 6 forms part of a field-effect transistor with an *n*-type source zone 7 adjacent to surface 2, which zone completely surrounds an *n*-type drain zone 8 also adjacent to surface 2. The part of the *p*-type epitaxial layer 3 between the source and drain zones 7 and 8 constitutes the channel area of the field-effect transistor. Zone 7 and 8 have a thickness of approximately 2 microns. Layer 3 forms a p-n junction 9 with the underlying *n*-type area 4. The source and drain zones 7 and 8 form p-n junctions 10 and 11 with the channel area 3. Between the gate electrode 6 and surface 2 there furthermore is a conductive layer 12 of polycrystalline silicon separated from gate electrode 6 and surface 2 by oxide layer 5. Layer 12 is not provided with a connection conductor and is completely surrounded by the oxide 5. The thickness of the oxide between layers 12 and 6 is 0.11 micron, the thickness of the oxide between layer 12 and the silicon surface 2 is 0.14 microns. The contact between regions 3 and 4 and zones 7 and 8 is ensured in the usual way by metal layers 13 through 16, for instance aluminium layers.

The field-effect transistor described above whose structure in itself is new, is particularly suitable for use in semiconductor memory devices according to the invention, as shown in FIGS. 1 and 2. This memory device also comprises means (see FIG. 2), including the schematically drawn voltage sources $V_1$ and $V_2$, of forming temporarily a depletion zone adjacent the insulating layer 5 in layer 3 below the gate electrode 6. The circuits drawn relate to the situation when information is being stored. The limit of this depletion zone in layer 3 is schematically indicated in FIG. 2 by a dotted line 17. This depletion zone is formed by applying a blocking voltage $V_2$ across the p-n junctions 10 and 11 and by applying a positive voltage with respect to layer 3 to gate electrode 6, so that in the region of the depletion zone holes are removed from region 3.

It is now possible to inject electrons from layer 3 into the silictan oxide 5 below gate electrode 6; these electrons charge floating electrode 12 and are retained there for a long time. Thus the threshold voltage of the field-effect transistor can be changed appreciably. In the semiconductor memory devices known so far this electron injection was performed, as was already mentioned, by applying so high a voltage across the depletion zone 17, at least locally, for instance at the edge of the p-n junctions 10 and/or 11, that avalanche multiplication occurs. The electron-hole pairs then generated provide the charge carriers which are injected into the oxide with or without the aid of a field applied between gate electrode 6 and layer 3. According to the present invention, however, this avalanche injection is not utilised for injecting electrons, but between the gate electrode 6 and the silicon 3, as well as across the p-n junctions 10 and 11 voltages $V_1$ and $V_2$ are temporarily applied which are so low that no avalanche multiplication occurs in the depletion zone 17; yet the voltages are higher than the potential barrier for electrons at junction 2 between silicon layer 3 and oxide layer 5, which potential barrier is approximately 3.25 V. The breakdown voltage of the p-n junctions 10 and 11 is about 17 V.

According to the invention voltage $V_2$ is consequently equal to or higher than approx. 4 V during injecting, but lower than 17 V (the breakdown voltage of junctions 10 and 11), while the maximum voltage between gate electrode 6 and layer 3 depends on the thickness and nature of the material between electrode 6 and the semiconductor surface 2. In view of the foregoing it must, however, also be at least about 4 V. The upper limit of voltage $V_1$ is determined by the condition that the maximum field intensity thus generated in layer 3 must be lower than the one at which avalanche multiplication occurs.

During injection p-n junction 9 is moreover biased in forward direction by means of voltage source $V_3$. On account of this electrons are injected into the depletion region 17 from substrate 4. This is necessary, because per unit of time only very few electrons find their way from zones 7 and 8 to depletion zone 17 across the blocked p-n junctions 10 and 11, via a leakage current across these junctions. Naturally the p-n junction 9 must for this purpose lie at a short distance, preferably less than one diffusion length for electrons away from junctions 10 and 11, at least from the depletion zone 17. This condition is met in the example.

The floating electrode 12 serves as an equipotential surface and promotes the formation of a homogeneously distributed charge between gate electrode 6 and surface 2 below it. Of the supply and drain zones, if so desired, at least the drain zone 8 can be replaced by a Schottky diode.

The mode of operation of the device described above can be demonstrated with the aid of the following example. Voltage $V_2$ was made equal to 6 V for 5 seconds, voltage $V_1$ equal to 35 V, while the forward voltage $V_3$ across p-n junction 9 has a value of 0.6 V. Subsequently these voltages $V_1$, $V_2$ and $V_3$ were cut off. The threshold voltage $V_{th}$ of the field-effect transistor was then measured by the usual test methods, junction 9 being short-circuited. It was found that the threshold voltage had shifted from the original value of +5 V to a value of about + 15 V.

Figure 3:
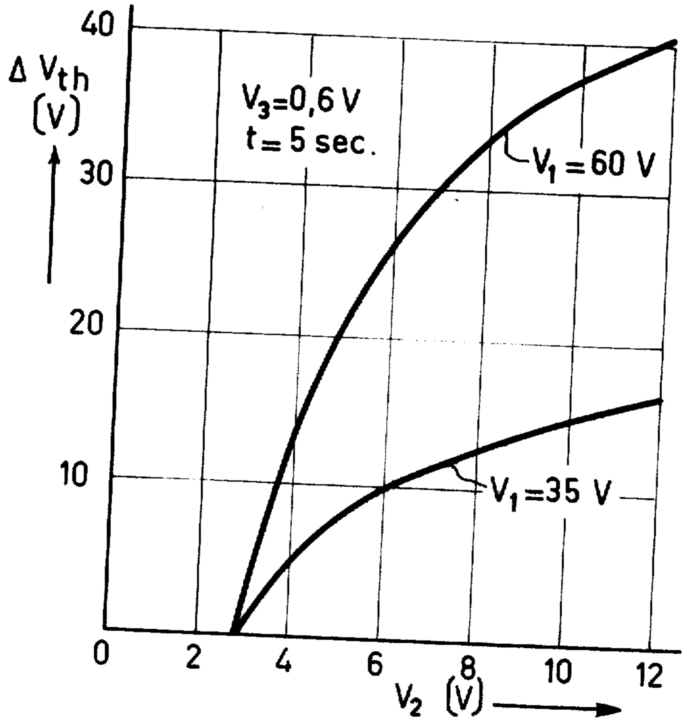
FIG. 3 shows a graphic representation of characteristics of the device according to FIGS. 1 and 2, FIG. 4 gives a graphic representation of the characteristics of another device containing a field-effect transistor according to the invention, FIG. 5 diagrammatically shows a top view of a semiconductor memory device according to the invention with a bipolar transistor, FIG. 6 diagrammatically shows a cross-section according to the line VI—VI of the device according to FIG. 5 and, FIG. 7 diagrammatically shows a cross-section of another version of a semiconductor memory device according to the invention.
Figure 4:
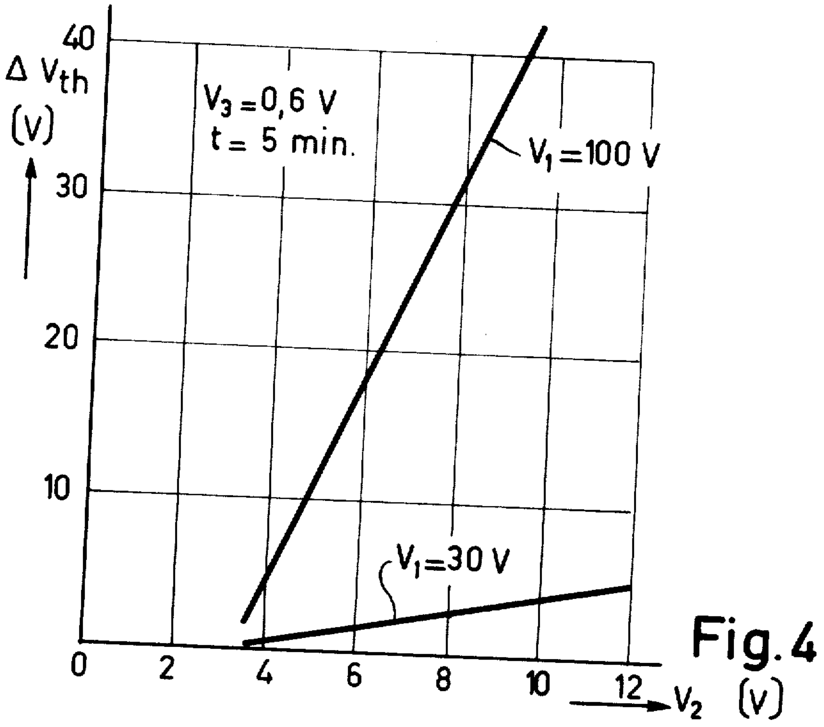

The shift $\Delta V_{th}$ of the threshold voltage strongly depends on the height of the blocking voltage $V_2$ across the source and drain junctions and on the height of the gateelectrode voltage $V_1$ at a given injection duration and given value of the forward voltage $V_3$ across p-n junction 9. For instance, the shift $\Delta V_{th}$ in the above example was not 10 V but approx. 26 V, under otherwise identical injection conditions, but at a gate-electrode voltage $V_1$ of 60 V, positive with respect to layer 3. This is shown in FIG. 3 which gives the relationship measured between $\Delta V_{th}$ and $V_2$ for two different values of $V_1$. The floating gate electrode 12 can be omitted; this, however, requires longer injection times to obtain comparable shifts in the threshold voltage. See for instance FIG. 4 in which the characteristics are given for a device analogous to that of FIGS. 1 and 2, but without floating electrode 12 and with an oxide-layer thickness of 0.26 micron below the gate electrode. In this case the injection times are approximately 60 times longer.

It will be clear from the foregoing that it is possible to change considerably the threshold voltage of a field-effect transistor with insulated gate electrode by using the invention without initiating an avalanche process. It is even possible to change such a transistor which before the injection was a depletion field-effect transistor (i.e. it was already conductive between the source and drain zones without gate-electrode voltage) into an enhancement transistor which requires a certain gate-electrode voltage for establishing a channel between the source and drain zones.

If a plurality of these field-effect transistors is used in an electronic memory, information can be fed into the circuit by applying the above-described injection method to some transistors and leaving the others unaffected. Subsequently the information can be read out non-destructively, for instance by measuring the threshold voltage of the transistors. It is also possible to apply the charge injection method to the various transistors of the memory in different degrees. Erasing information, i.e. removing the charge injected between gate electrode 6 and surface 2, can be effected in various ways, for instance by using ionising radiation, such as X-radiation or ultra-violet radiation for irradiating the gate oxide layer. The ionisation thus caused neutralises the afore-mentioned charge. Such an erasing method however is very complicated.

The information stored can be erased more simply by temporarily polarising the junctions 10 and/or 11 in reverse direction to such an extent that avalanche breakdown occurs, as a result of which holes are injected into oxide layer 5 which recombine with the information-carrying electrons.

The injection of electrons into depletion zone 17 can also be effected by making radiation impinge on surface 2 below the gate electrode, the radiation either passing through the gate electrode or, by deflection and relfection, impinging under the edge of the gate electrode. If aptly chosen, this radiation will thus generate electronhole pairs in depletion zone 17.

Still another manner of erasing is possible if the insulating layer between the electrodes 6 and 12 shows a non-linear resistance, as a result of which the conductivity thereof, for high values of the voltage at the gate electrode 6, increases to such an extent that the charge present on the electrode 12 is drawn away to the electrode 6 through the insulating layer. It has been found that by repeated recording and erasing, the threshold voltage can be varied many times in a reproducible manner between, for example, 0 and +20 Volt.

In the example described above depletion zone 17 is formed partly by the p-n junctions 10 and 11 biased in reverse direction and partly by the voltage difference applied between gate electrodes 6 and layer 3. It is also possible, however, to manufacture devices according to the invention in which the depletion zone is obtained either only via a p-n junction, or only by means of a gate-electrode structure, as will be explained below.

Figure 5:
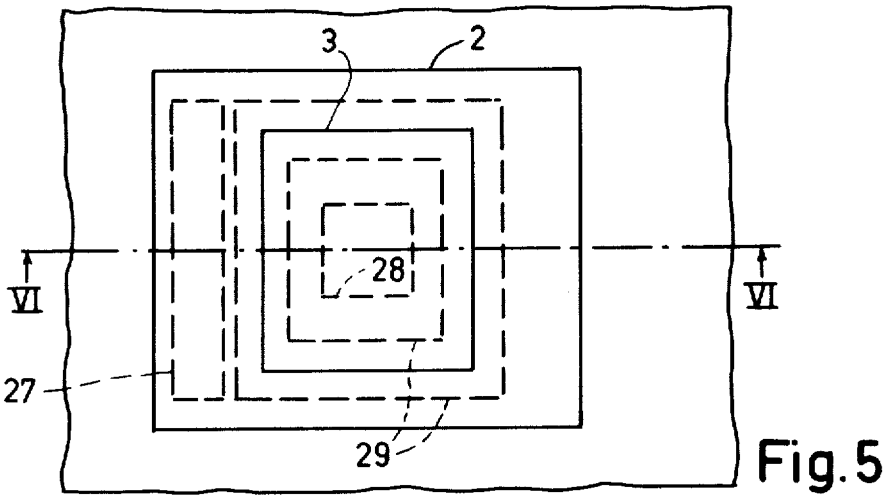
Figure 6:
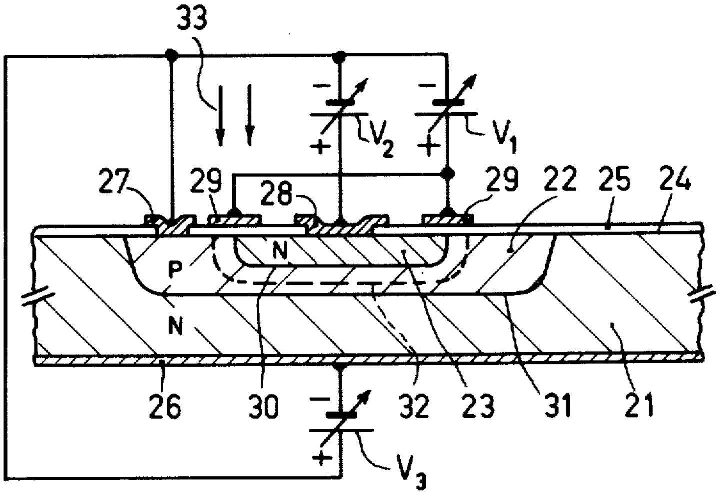

FIG. 5, for instance, shows a diagrammatic top view and FIG. 6 a diagrammatic cross-section according to the line VI—VI of FIG. 5 of another semiconductor memory device according to the invention. This device is designed as a bipolar planar transistor with an *n*-type collector zone 21, a *p*-type base zone 22 and an *n*-type emitter zone 23. Zones 21, 22 and 23 are all adjacent to surface 24, the greater part of which is covered with a silicon-oxide layer 25. Emitter zone 23 has a surface of approx. $10^{-2}$ mm$^2$, a thickness of approx. 3 microns and a surface dope concentration of approx. $10^{20}$ atoms per cm$^3$. Base zone 22 has a thickness of approx. 5 microns and a surface dope concentration of approx. $6 \times 10^{17}$ atoms/cm$^3$. The breakdown voltage of the emitter-base junction is approx. 8.3 V. Contact between zones 21, 22 and 23 is established by means of the metal layers 26, 27 and 28; these zones constitute an emitter-base p-n junction 30 and a collectorbase junction 31.

Above the entire circumference of the emitter-base junction 30 a metal gate electrode 20 has been placed on the oxide layer 25. The thickness of oxide layer 25 below gate electrode 29 is 0.6 microns; the surface of the base zone 22 situated below gate electrode 29 is approx. $3.5 \times 10^{-2}$ mm$^2$.

FIG. 6 shows a diagram of a circuit and voltages used for storing information. Emitter-base junction 30 is temporarily biased in reverse direction by means of a voltage source $V_2$. Thus a depletion zone is formed at this junction; in FIG. 6 the boundary of this depletion zone in base zone 22 is indicated by dotted line 32. Voltage $V_2$ is higher than approx. 4 V, i.e. higher than the energy barrier of 3.25 V for electrons at the silicon-$SiO_2$ junction.

According to the invention voltage $V_2$ is, however, considerably lower than the breakdown voltage of junction 30 which is approx. 8.3 V.

During the injection a voltage $V_1$, also at least 4 V, and positive with respect to base-zone 22, is furthermore applied to gate electrode 29. Thus an electric field is generated in the base zone near surface 24, which field exerts a force directed to surface 24 to the electrons in base zone 22 thus enabling the electrons to move from the conduction band in the silicon into the conduction band of the silicon oxide, where they are retained in traps.

As the electrons are only very slowly supplied via the weak leakage current from emitter zone 23 across the p-n junction 30 biased in the reverse direction to base zone 22, according to the invention during the storing of information electrons are injected into the depletion zone 32. As in the previous example, this can be done in two ways, that is, either by generating electron-hole pairs in depletion zone 32 with the aid of radiation impinging according to the arrows 33 or by injection across a p-n junction. In this example the latter method is adopted. The injecting p-n junction used is the collector-base junction 31 which is biased in forward direction by means of voltage source $V_3$ during the storing of an information carrying charge into oxide layer 25.

After the negative charge has been fed into the oxide below gate electrode 29 in the way described above, the voltages or the radiation used for this purpose are switched off. By measuring the characteristics in the usual way it can then be ascertained that the electrical properties of the transistor have changed in comparison with the situation before injection, as was already described, for instance in "Applied Physics Letters", Oct. 15th 1969, pp. 270–272, for known devices of this type, in which the charge injection was effected by making use of avalanche multiplication. This change can be measured in various ways, for instance as a change of the amplification factor at equal values of the emitter, base and collector potentials, as a function of the gate-electrode potential before and after injection, or as a change in the variations of the base current as a function of the gate-electrode voltage, before and after injection, all other circumstances being equal.

As in the previous example, information can be erased, i.e. the injected information-carrying charge can be neutralised, either by means of ionising radiation, or by injection of holes into the oxide layer by temporarily applying a voltage across p-n junction 30 which in reverse direction is higher than the breakdown voltage and by applying a voltage to gate electrode 29 which is negative with respect to base zone 22.

In this example depletion zone 32 was during injection formed almost exclusively by applying a voltage in reverse direction across p-n junction 30.

Figure 7:
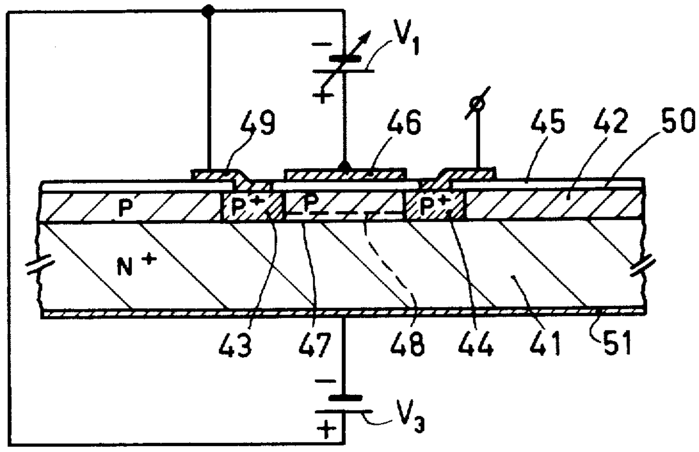

Yet another possibility is that the depletion zone is formed almost exclusively by applying a voltage between the gate electrode and the silicon region below it. By way of example FIG. 7 diagrammatically shows a cross-section of a device with a so-called deep depletion field-effect transistor with insulated gate electrode. This device contains a substrate 41 of *n*-type silicon with a specific resistance of 0.01 Ohm.cm. to which a *p*-type layer 42 with a specific resistance of 0.2 Ohm.cm. and a thickness of 1 micron has been applied epitaxially. Layer 42 contains highly doped *p*-type source and drain zones 43 and 44, also throughout the entire thickness of layer 42. If so desired, these zones can be replaced by ohmic metal contacts on layer 42. The greater part of layer 42 is coated with a siliconoxide layer 45 with a thickness of approx. 0.3 micron. Between the source and drain zones a gate electrode in the form of a conductive layer 46 has been applied to this layer 42; layer 46 should preferably be a metal layer, or, if so desired, it may also be a layer of, say, highly doped polycrystalline silicon. Together with the n-type substrate 41 *p*-type layer 42 constitutes a p-n junction 47.

During injection of information-carrying charge into oxide layer 45 below gate electrode 46 a potential $V_1$, positive with respect to layer 42, is applied to gate electrode 46; the contact with layer 42 is established by means of source zone 43 with aluminium contact layer 49, see FIG. 7. As a result of this a depletion zone is formed in the channel area of layer 42 between source and drain zones 43 and 44; the limit of this depletion zone if layer 42 is indicated by a dotted line 48. This also causes the formation of a field driving the electrons accelerated in the depletion zone in the direction of semiconductor surface 50. If now voltage V1 is so high that a voltage drop of at least approx. 4 V occurs across depletion zone 48, these accelerated electrons will move from the conduction band in the layer 42 into the conduction band of the oxide layer 45 and be retained there in traps.

In this case use is made again of injection via p-n junction 47 between substrate 41 and epitaxial layer 42 for the necessary supply of electrons to depletion zone 48.

This is done by applying a voltage in forward direction via voltage source $V_3$ and contact layers 49 and 51 across this p-n junction 47 during injection. Alternatively radiation impinging on surface 50 can be used to effect this supply. As in the first example, a shift of the threshold voltage with respect to the original situation can be observed after injection of the information carrying charge.

In this device depletion zone 48 is exclusively brought about by the voltage between gate electrode 46 and layer 42. With this version a difficulty may, however, occur on account of the formation of an inversion layer in layer 42 at surface 50 between source and drain zones 43 and 44 as a result of the generation of electrons in depletion zone 48. These electrons will concentrate at surface 50 and impede the extension of depletion zone 48 over the thickness of the channel area. In the previous examples this drawback was eliminated by the presence of p-n junctions 10 and 11 or 30, polarised in reverse direction, which suck away the electrons immediately after they have been generated in the depletion zone. In practice said depletion zone will preferably be adjacent to a p-n junction biased in reverse direction during storing, though a device as sketched in FIG. 7 may be useful, in particular at very short storing times and very high injection current across junction 47.

The semiconductor structures described can be manufactured by means of methods conventionally used in semiconductor technology, for example, diffusion, ion implantation, epitaxial growth, thermal oxidation, pyrolytic deposition of insulating layers and photolithographic etching methods. Since it is possible for those skilled in the art to choose from the available methods that one which is most suitable for each individual application, it is not deemed necessary to describe this in detail. It is pointed out only that very good results have been obtained by providing in the structure of FIG. 2 the oxide layer between the surface 2 and the electrode 12 by thermal oxidation, and by using phosphorus-doped pyrolytic oxide ("silox") for the insulate layer between the electrodes 6 and 12.

As will be clear, the invention is not confined to the versions described here, as the invention permits of many variations by the experts in the field.

One of the most important of those is that it is possible to replace the conduction types of all semiconductor zones in the devices described here by their opposites, the polarity of the voltages used being simultaneously reversed. It has in fact been found that holes can also be injected into the insulating layer instead of electrons, to change the characteristics of the devices described.

Under certain circumstances the insulating layer between the gate electrode and the semiconductor surface may advantageously consist of a layer of silicon dioxide covered by a layer of silicon nitride, in which case traps for the charge carriers to be injected are formed at the oxidenitride junction.

It is to be noted that in certain circumstances the recording of information can often be carried out advantageously by means of several voltage pulses of short duration instead of by applying a continuous voltage $V_1$.

Finally the geometry of the memory device can be chosen differently, the field-effect transistor of FIGS. 1 and 2 can, for instance, be given a circular and concentric shape, while it is also possible to use semiconductor materials other than silicon and insulating materials other than silicon oxide.

What is claimed is:

1. A semiconductor memory device comprising:

a. a semiconductor body comprising a first region that is adjacent to the surface of said body, b. an electrically insulating layer that at least partly covers said first region, c. a gate electrode disposed over said semiconductor body surface and separated therefrom by said insulating layer, d. means for forming a depletion zone adjacent to said insulating layer in said first region below the gate electrode, whereby charge carriers can be injected from said semiconductor body into said insulating layer and the electrical properties of said device thereby changed, said depletion zone forming means comprising means for providing across said depletion zone a voltage drop that is lower than the voltage at which avalanche multiplication occurs, but higher than the potential barrier for said charge carriers at the interface between said semiconductor body and said insulating layer, e. means for injecting said charge carriers into said depletion zone, and f. means for simultaneously applying a voltage to said gate electrode to exert on said charge carriers a force in the direction of said interface.

2. A semiconductor memory device as in claim 1, comprising a rectifying junction that is located at said first region and ends at said interface below said gate electrode, and means for temporarily applying a reverse voltage across said rectifying junction so as to form at least part of said depletion zone.

3. A semiconductor memory device as in claim 2, comprising a p-n junction that is adapted to be temporarily biased in the forward direction, whereby said charge carriers can be injected into said depletion zone.

4. A semiconductor memory device as in claim 1, comprising means for temporarily applying a voltage between said gate electrode and said first region such that majority carriers are removed from a surface zone of said first region, thereby forming at least part of said depletion zone.

5. A semiconductor memory device as in claim 4, wherein the distance between said p-n junction and said rectifying junction is at most one diffusion length of the charge carriers in said region.

6. A semiconductor memory device as in claim 1, comprising means for temporarily impinging radiation on said semiconductor body, whereby said radiation generates electron-hole pairs in said depletion zone and said charge carriers are injected into said depletion zone.

7. A semiconductor memory device as in claim 1, comprising an insulated gate field-effect transistor that includes said gate electrode and said insulating layer and further comprises source and drain electrodes and a channel area therebetween, said depletion zone being formed in channel area of said transistor, said channel area being disposed in said first region.

8. A semiconductor memory device as in claim 7, wherein said field-effect transistor is one of the depletion type and the enhancement type and is adapted to be converted into a transistor of the other type by the injection of information-carrying said charge carriers.

9. A semiconductor memory device as in claim 7, wherein said field-effect transistor comprises a layer-shaped said channel area of said first conductivity type disposed adjacent to said body surface and an underlying region of second conductivity type, said channel area and said underlying region forming a p-n junction that is adapted to be temporarily forward biased and is substantially parallel to said surface and comprises said charge carrier injecting means.

10. A semiconductor memory device as in claim 7, comprising an electrically floating conductive layer disposed between said gate electrode and said semiconductor surface and separated from both thereof by portions of said insulating layer located between said gate electrode and said semiconductor surface.

11. A semiconductor memory device as in claim 10, wherein said conductive layer consists essentially of polycrystalline silicon.

12. A semiconductor memory device as in claim 2, wherein said insulating layer disposed between said gate electrode and semiconductor body surface comprises at least two layers respectively consisting essentially of silicon oxide and silicon nitride, one of said layers being disposed on top of another.

13. A semiconductor memory device as in claim 1, comprising a bipolar transistor that includes an emitter-base junction adapted to be temporarily biased in the reverse direction and a collector-base junction adapted to be temporarily biased in forward direction, said collector-base junction comprising said charge carrier injecting means.

14. A semiconductor memory device as in claim 1, wherein the semiconductor material of said semiconductor body consists essentially of silicon and at least the part of said insulating layer adjacent to said body surface consists essentially of silicon dioxide, wherein said depletion zone forming means provides said voltage drop across the depletion zone that is at least equal to 4 volts.

15. A semiconductor memory device as in claim 1, wherein said injection of said charge carriers into said insulating layer provides stored information and said device comprises a rectifying junction that is located at said first region and ends at said interface below said gate electrode, and means for temporarily applying a reverse voltage across said rectifying junction so as to form at least part of said depletion zone and further comprises means for temporarily biasing said rectifying junction in reverse direction so as to produce avalanche multiplication, whereby said stored information can be erased.

16. An insulated gate electrode field-effect transistor with suitable for use in a semiconductor memory device, comprising a semiconductor body with a layer-shaped channel area of a first conductivity type adjacent to a surface of said body, a second region of second conductivity type underlying said channel area and forming therewith a p-n junction, source and drain electrodes adjacent to said surface, an insulating layer present on said semiconductor body surface at least between said source and drain electrodes, a gate electrode disposed over said semiconductor surface and separated therefrom by said insulating layer, and an electrically floating conductive layer disposed between said gate electrode and said body surface, said conductive layer being separated from said gate electrode and said semiconductor body surface by said insulating layer.

* * * * *